United States Patent
Yamazaki et al.

(10) Patent No.: US 6,724,777 B1
(45) Date of Patent: Apr. 20, 2004

(54) WIRELESS DATA COMMUNICATION SYSTEM HAVING IMPROVED DATA COMMUNICATION EFFICIENCY

(75) Inventors: Kazuji Yamazaki, Kariya (JP); Yukihiro Yamamoto, Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/388,209

(22) Filed: Sep. 1, 1999

(30) Foreign Application Priority Data

Sep. 1, 1998 (JP) .......................... 10-247360

(51) Int. Cl.$^7$ ................................. H04J 3/24
(52) U.S. Cl. .................. 370/473; 370/470; 370/471; 370/472
(58) Field of Search ................. 370/235, 236, 370/242–245, 252–253, 465, 468, 470–472, 532–533, 540

(56) References Cited

U.S. PATENT DOCUMENTS

| | | | | |
|---|---|---|---|---|
| 4,667,334 A | * | 5/1987 | Collec et al. ............... | 375/368 |
| 5,339,316 A | * | 8/1994 | Diepstraten ................. | 370/401 |
| 6,023,475 A | * | 2/2000 | Tanaka et al. ............... | 370/471 |
| 6,266,360 B1 | * | 7/2001 | Okamoto ..................... | 375/140 |
| 6,359,877 B1 | * | 3/2002 | Rathonyi et al. ........... | 370/349 |

FOREIGN PATENT DOCUMENTS

| | | | |
|---|---|---|---|
| JP | 63-62525 | 3/1988 | ............. H04L/1/00 |
| JP | 6-232795 | 8/1994 | |
| JP | 9-36816 | 2/1997 | |
| JP | 9-93155 | 4/1997 | |

\* cited by examiner

*Primary Examiner*—Chi Pham
*Assistant Examiner*—Thai Hoang
(74) *Attorney, Agent, or Firm*—Morgan & Finnegan, LLP

(57) ABSTRACT

A second processor 6 inserts data to be transmitted and pointer information into a data packet and transmits the data packet at step S20 and then determines whether an acknowledgement from the receiving party has been received at step S22. If no acknowledgement has been received, a determination is made as to whether the number of re-transmissions is equal to or less than a predetermined re-transmission number at step S32. If the re-transmission number is equal to or less than the preset value, then a data packet 16 with the same data is transmitted at step S20. However, if the re-transmission number has reached the preset value, then the number of data bits per data packet is reduced at step S36, and a data packet with reduced data is transmitted at step S20.

14 Claims, 6 Drawing Sheets

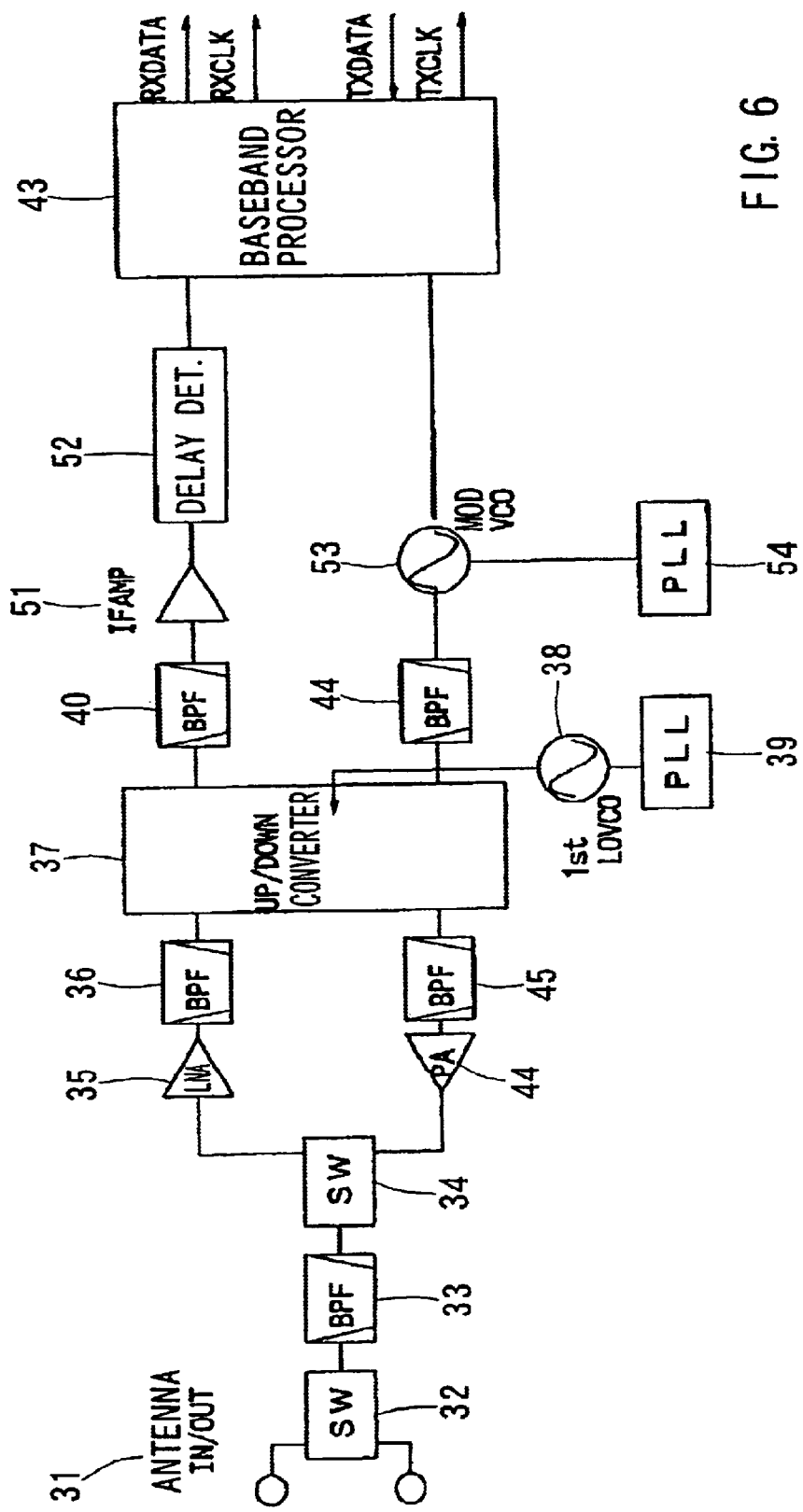
F I G. 6

WIRELESS DATA COMMUNICATION SYSTEM HAVING IMPROVED DATA COMMUNICATION EFFICIENCY

BACKGROUND OF THE INVENTION

1. Field of the Invention

The present invention generally relates to data communication methods and systems, and more particularly to wireless data communication methods systems that enable reliable, efficient data communications even in noisy environments.

2. Description of the Related Art

In wireless data communication, the existence of interfering radio waves in the carrier frequency band can impair accurate and complete data transmission. For example, in a wireless communication that is implemented in the frequency range of 2.4 GHz by using Direct Sequence Spread Spectrum (DS-SS) or Frequency Hopping Spread Spectrum (FH-SS) transmission techniques, noise generated from a high-frequency heater (e.g., a microwave heater) can interfere with the data transmission. In particular, if the number of data bits transmitted at one time is relatively large (i.e., if the length of the data block in a data packet is relatively long), then errors are likely to occur during transmission because of such interference. As a result, the same data must be transmitted repeatedly until a successful transmission can be completed. However, as the number of repeated transmissions herein, the "re-transmission number") that are required to successfully complete the transmission increases, the data communication efficiency consequently decreases.

To improve data communication efficiency, a data communication system that changes the length of the data block (i.e., the number of data bits Sent in an individual data packet) in correspondence with the communication environment has been proposed in Japanese Laid-Open Patent Publication No. 6-232795. This data communication system calculates the signal-to-noise ratio (S/N ratio) and then determines the length of the data block to be transmitted based upon this calculated S/N ratio. In a noisy environment, the S/N ratio is relatively low. Therefore, the data block is shortened to reduce the occurrence of communication errors. In this way, data can be reliably transmitted even in a noisy environment.

However, this prior art data communication system involves complicated processes, such as measurement of the carrier reception level for which data is not received (N) and the signal reception level for received data (S), as well as the above mentioned calculation of the S/N ratio.

SUMMARY OF THE INVENTION

Therefore, it is an object of the present invention to teach data communication methods and systems that enable data reliable and efficient data communication using a relatively simple algorithm.

Preferably, wireless data communication methods are taught in which a processor first creates a packet of data that will be transmitted. This data packet may include data representing the intended communication as well as a data size indicator. This data packet is then transmitted to the intended recipient. If the intended recipient does not receive the data packet, possibly due to interference in the carrier frequency band, the data packet may be re-transmitted a predetermined number of times. If the intended party still has not received the data packet after the predetermined number of re-transmissions, the number of data bits in the data packet may be reduced and the reduced size data packet may be transmitted. If the reduced size data packet still is not received by the intended recipient after a second predetermined number of transmissions, the number of bits in the reduced size data packet may be further reduced. This re-transmission method may be continued until successful data transmissions are completed.

In the alternative or in addition to, the data packet may be divided, if the intended recipient has not received the data packet after a predetermined number of transmissions. The divided data can then he used to create new data packets that are transmitted to the intended recipient.

Data communication systems for transmitting data are also taught and preferably include a processor for creating the data packets to be transmitted to the intended recipient. The processor may also monitor the number of unsuccessful transmissions of a particular data packet. If the number of unsuccessful transmissions reaches a predetermined number, the length of the data packet may be reduced before further transmissions of the data packet. In addition to or alternatively, the data packet may be divided and the divided data packets may be sent.

These data communication methods and systems provide a relatively simple process for transmitting data that is especially useful in noisy environments. Reliable and efficient communications arc enabled with a minimum of processing circuitry.

Other objects, features and advantages of the present invention will be readily understood after reading the following detailed description together with the accompanying drawings and the claims.

BRIEF DESCRIPTION OF THE DRAWINGS

FIG. 6 is a block diagram of a second representative circuit for implementing the data communication methods of FIGS. 3 and 4.

DETAILED DESCRIPTION OF THE INVENTION

Figure 1:
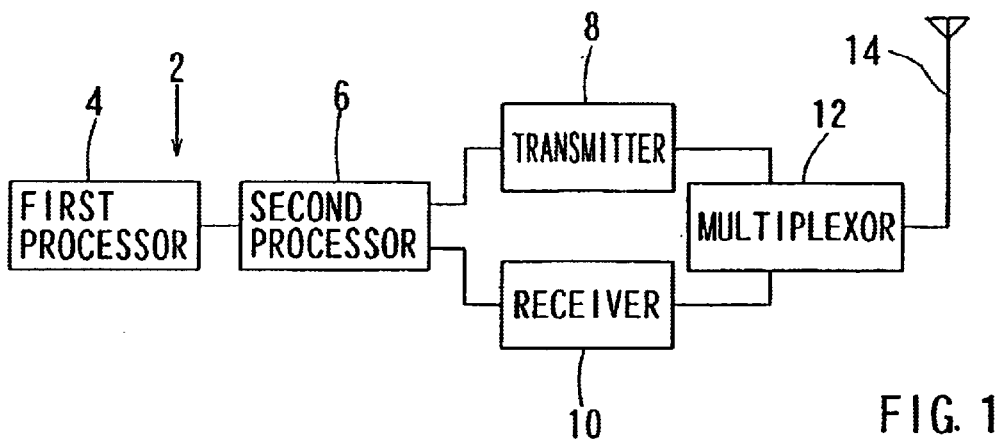
FIG. 1 is a block diagram of a representative data communication system.

In a first representative data communication method, a preset number of data bits may be transmitted in a normal communication environment in which interference does not interrupt the communication. However, if the intended recipient does not receive the transmitted data packet, the same data packet may be re-transmitted. If the intended recipient still does not receive the data packet, even though the same data packet may have been repeatedly transmitted a number of times, possibly due to interference, the number of data bits in the data packet can be reduced and the new data packet may be transmitted. By reducing the number of data bits carried by the data packet, the occurrence of communication errors due the interfering electromagnetic waves car be reduced, thereby improving data communication efficiency. The first representative method only requires a determination as to whether the number of times that the data has been transmitted has reached a predetermined re-transmission number, and therefore provides a relatively simple re-transmission algorithm.

This representative method may be improved by counting the number of times that data packets of reduced size are successfully transmitted. If a predetermined number of continuous successful transmissions occur, the number of data bits per data packet can be increased. As a result, the data communication efficiency can be further improved, because the number of data bits per data packet is adjusted appropriately in correspondence with the communication environment.

In a second representative data communication method, all communication data to be transmitted is first communicated to a processor and the processor creates a data packet. In particular, the processor determines the number of data bits per data packet. A transmitter will then transmit all of the data bits in the data packet, if the transmission environment does not contain sufficient interference to disrupt the communication path. However, if the intended recipient does not in fact receive the data packet, the same data packet may first be re-transmitted. If the intended recipient still does not receive the data packet after a predetermined number of re-transmissions, possibly due to interfering electromagnetic waves, then the data packet can be reduced in size and re-transmitted. By transferring all the data to be transmitted to the processor at one time and permitting the processor to perform the data packet reduction, the time required for transferring all the data can be substantially shortened.

Each of the additional features and method steps disclosed above and below may be utilized separately or in conjunction with other features and method steps to provide improved data communication methods and systems and methods for designing and using such data communication systems. Representative examples of the present invention, which examples utilize many of these additional features and method steps in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

A first representative data communication system and method will be described in further detail with reference to FIG. 1 to FIG. 3. A detailed discussion concerning well known spread-spectrum communication and frequency-hopping techniques has been omitted, because the person skilled in the art is already well versed in such techniques. An extensive discussion of such communication techniques may be found, for example, in R. Dixon, Spread Spectrum Systems with Commercial Applications (J. Wiley & Sons, 3d ed. 1994).

FIG. 1 shows a block diagram of a preferred data transceiver system 2, which may comprise a first processor 4 and a second processor 6. A transmitter 8, which modulates data into transmission signals, and a receiver 10, which demodulates signals received into data that can be processed by the first processor 4 and/or the second processor 6, are coupled to the second processor 6. A multiplexor 12 may separate the transmission signals from the reception signals and vice versa in order to permit the use of a single antenna 14, which can he used for both transmission of data packets and reception of acknowledgement signals.

Figure 2:
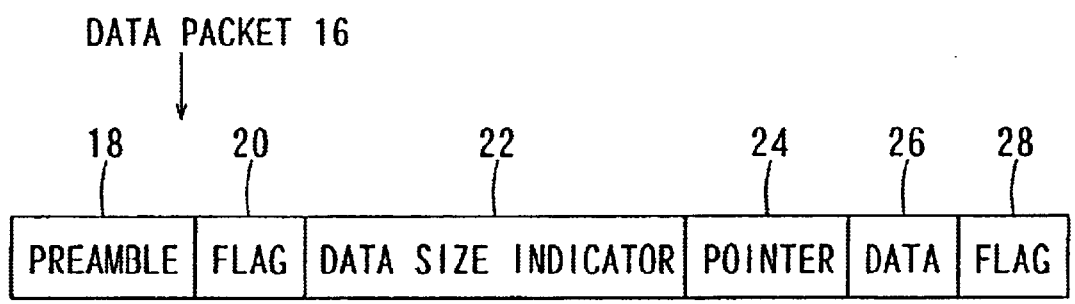
FIG. 2 shows the format of a representative data packet that can be used in the representative data communication system.
Figure 3:
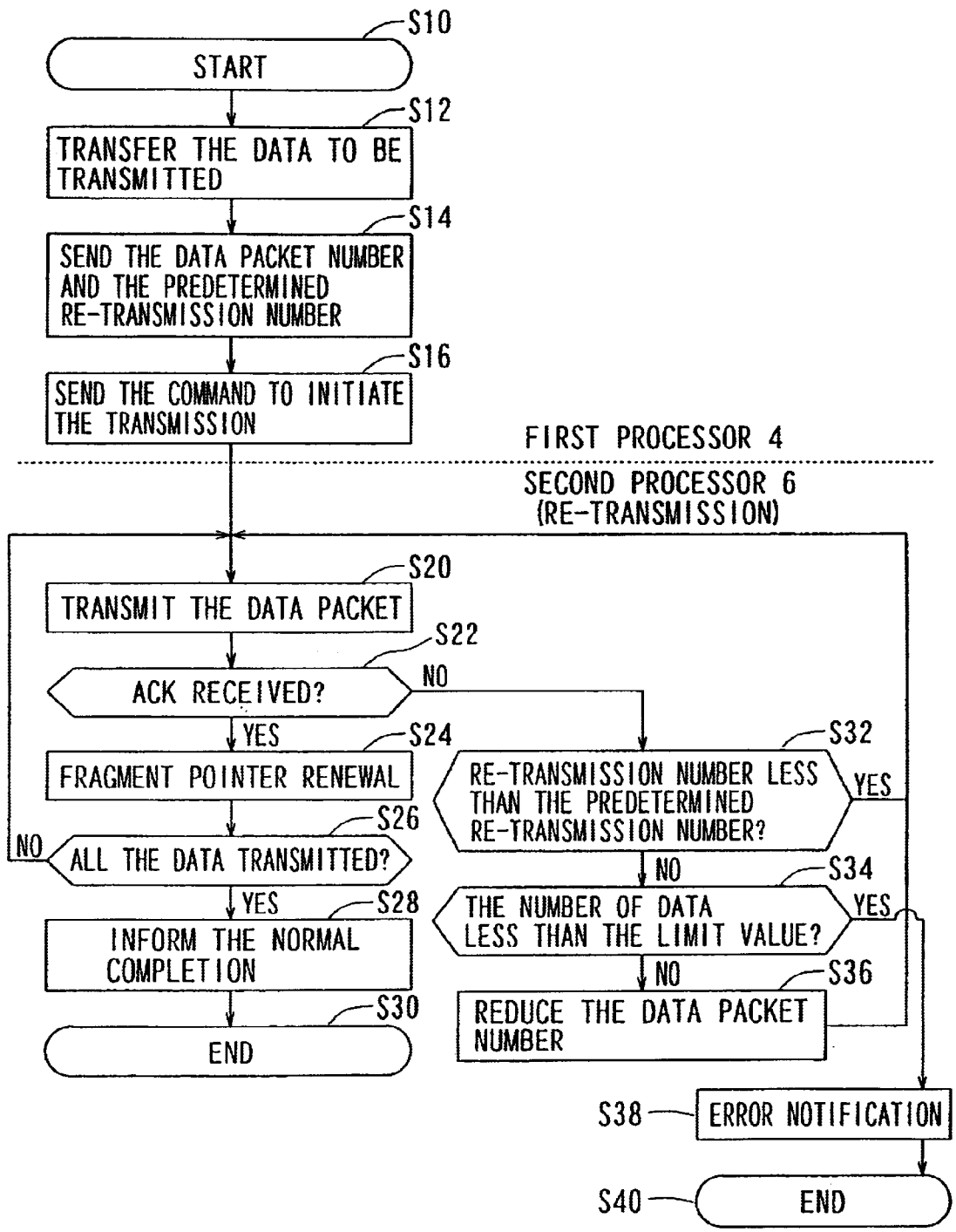
FIG. 3 is a flowchart that shows a first representative data communication method.

FIG. 2 shows the format of a representative data packet. Naturally, other data formats may be utilized with the present teachings as is appropriate for a particular communication system. For example, the order of the data or the types of data may be changed or omitted as need be.

The data packet 16 used in this representative embodiment may include a plurality of portions, such as a preamble 18, a first flag 20, a data size indicator 22, a pointer 24, communication data 26 and a second flag 28. The preamble portion 18 may include a control character that indicates the start of the data packet 16. The first flag portion 20 may include a control character that indicates the start of a datagram. The data size indicator portion 22 may include information that indicates the number of data bits (i.e., the length of the data block) carried in the communication data portion 26. The pointer portion 24 may include a control character that indicates the sequence of the data packet 16 in the datagram (this pointer information may be provided in increasing sequence numbers). The communication data portion 26 may include the encoded data for use by the receiving party. Finally, the second flag portion 28 may include a control character that indicates the end of the datagram.

The first representative data communication method will be described in further detail in conjunction with the data communication system shown in FIG. 1. As shown in FIG. 3, the data communication process is initiated at step S10. In step 12, the data to be transmitted is transferred from the first processor 4 to the second processor 6. This transmitted data may be stored in a memory that is provided in the second processor 6. In this example, the number of data bits transferred from the first processor 4 to the second processor 6 is less than the total number of data bits that are transmitted in one data packet during normal operating conditions (preset data number).

In step S14, a data packet number and a predetermined re-transmission number are sent from the first processor 4 to the second processor 6, and these values also may be stored in the memory of the second processor 6. The data packet number is preferably indicates the number of data bits to be carried in a data packet after the predetermined re-transmission number has been exceeded, which will be described in further detail below. The data packet number may represent the number of data bits in the data packet or the ratio of actual data bits in the data packet. For example, if the number of data bits is utilized, the number of data bit can be expressed as an integer, such as "15", "10", "5", etc. if, for example, the preset number of data bits in the data packet is "20." On the other hand, if the ratio of the number of bits of actual data to the total number of bits in the data packet is used, then the ratio can be expressed as a fraction, such as "⅔", "½", "⅓", etc.

Further, if the number of data bits carried in a data packet will be gradually reduced in several steps in the event that successful transmissions are not completed, the processor may generate a plurality of data packet numbers, each of which corresponds to a particular reduction. On the other hand, if the data packet number is expressed in the form of a ratio, the processor may utilize a single ratio. For example, if the ratio is chosen to be "½", the number of data bits can be reduced by one-half in the first reduction step. Likewise, in the second step, the number of data bits can be further reduced by one-half, i.e. to one-fourth of the original number of data bits. These data bit reductions can continue until the data packet is successfully transmitted. Optionally, the data packet number, the predetermined re-transmission number and other values may be stored in the memory of the second processor 6 in advance, instead of being sent from the first processor 6.

Returning to FIG. 3, a command lo initiate the transmission of the data is sent from the first processor 4 to the second processor 6 in step S16. After receiving this instruction, the second processor 6 inserts the communication data, which has been stored in the memory, into the data portion 25 of the data packet 16. Information concerning the number of the data bits that were placed in the data portion 26) is then included in the data size indicator portion 22. The processor 6 also may insert pointer information, which may be the sequence number for this data placket 16, into the pointer portion 24. In step S20, the second processor 6 transmits tiles data packet 16 to the receiving party using the transmitter 8, the multiplexor 12 and the antenna 14.

After transmitting the data packet 16, the second processor 6 determines whether the intended recipient for this communication has received the data. This determination can be made by determining whether an acknowledgement (ACK) signal has been received from the receiving party, as shown in step S22. If an ACK signal is received in step S22 ("YES"), the receiving party has successfully received the data. Therefore, the same pointer information, which is inserted into the pointer portion 24 of the data packet 16, is utilized in step S24. For example, the sequence number of the data packet 16 may be increased by adding "1".

In step S26, a determination is made as to whether all the data, which was previously transferred from the first processor 4, has been transmitted successfully or not. If the determination at step S26 is "YES", i.e., all the data has been successfully transmitted, then the second processor 6 informs the first processor 4 of the completion of the data transmission, which was performed under normal operating conditions in step S28. This particular data transmission process is then concluded in step S30.

If the first processor 4 transfers a new set of data to the second processor 6, after having received a signal that notifies the normal completion from the second processor 6, the data transmission process steps are initiated again beginning with step S12.

However, if the determination at step S26 was "NO", i.e., all the data has not yet been successfully transmitted, then the second processor 6 returns to step S20 to process the data that has not been transmitted yet. In this representative example, the first processor 4 has transferred fewer data bits to the second processor 6 than the preset total number of data bits in the communication data. Therefore, if step S26 is "NO", step S36 is then executed to reduce the number of data bits to be carried by a data packet to a number less than the preset data number. In this case, data that is stored in the memory and which has not yet been successfully transmitted, is inserted into the data portion 26 of the next data packet 16 in step S20.

If the determination at step S22 is "NO", the data is re-transmitted. In order to begin this re-transmission process, a determination is first made as to whether the number of repeated transmissions for the same data is equal to or less than the predetermined re-transmission number (step S32). If this determination in step S32 is "YES", then the process returns to Step S20 to retransmit the data packet 16 with the same data and the same pointer information.

However, if the receiving party is still unable to receive the data after a pre-determined number of re-transmissions, possibly due to the existence of interfering electromagnetic waves, and the determination at step S32 is "NO", then step S34 is executed to determine whether the number of The data bits that are placed in the data portion 26 of the data packet 16 is equal to or less than a limit value. In the alternative, the processor may determine in step S34 whether the number of reductions made to the number of data bits to be inserted into the data portion 26 of the data packet 16 is equal to or greater than a preset number.

If the determination at step S34 is "YES", thereby indicating that the environment has been determined to be unsuitable for reliable data communications using the current number of data bits, the second processor 6 notifies the first processor 4 of this error in step S38 and ends the data transmission process at step S40. On the other hand, if the determination at step S34 is "NO," then Step S36 is executed to set the number of data bits to be carried by a data packet to the data packet number that was provided by the first processor 4 at step S14. For example, if the first processor 4 communicated data packet numbers of "15", "10" and "5" (when, for example, the maximum number of data bits carried by the data packet is set at "20"), then the number of data bits per data packet is set to "15" at this time. However, if the number of data bits per data packet is currently set at "15," then the number of data bits will be reduced to "10". Alternatively, if the first processor 4 communicated the ratio "½" as the data packet number (when, for example, the maximum number of data bits per data packet is set at "20"), then the number of data bits per data packet is set to "10," i.e. "½" of "20."

After step S36, step S20 is executed to select data bit(s) from the communication data that have not yet been transmitted to determine the number of data bits per data packet set in step S36. The selected data bits are inserted into the data portion 26 of the next data packet 16. As a result, the number of data bits placed in the data portion 26 of the data packet 16 is reduced, and a data packet 16 with a reduced number of data bits can be transmitted this time. The process is repeated from step S22, and the re-transmission number counter is reset at the start of this process, because this repetition is considered to be the transmission of a new data packet.

If the determination at Step S22 is still "NO" even with this reduced number of data bits, then a determination is made as to whether the number of repeated transmissions for the same data is equal to or less than the predetermined re-transmission number in step S32. That is, the re-transmission number counter is checked. If the re-transmission number has reached the predetermined re-transmission number, then a determination is made whether the number of data bits per data packet is equal to or less than the limit value in step S34. If the number of data bits per data packer is not equal to or less than the limit value, then the number of data bits per data packet is set to the next data packet number to further reduce the number of data bits carried by the data packet in step S36. A data packet 16 with a further reduced number of data bit, is then transmitted at step S20.

As described above, the processes of re-transmitting the same data and/or reducing the number of data bits per data packet is repeated until a signal is outputted at step S28 notifying the first processor 4 that a normal transmission has been completed or until a signal notifying the first processor 4 that an error has occurred is output at step S38.

In the present data communication methods, every time that the re-transmission number reaches the predetermined re-transmission number, the number of data bits per data packet, i.e., the number of data bits to be transmitted in a single transmission, is reduced. In this way, data can be transmitted reliably with improved data communication efficiency, even in noisy environments. Because this method only requires a determination as to whether the re-transmission number has reached the predetermined re-transmission number, a simple process can be utilized to provide improved data communication efficiency. Furthermore, according to this method, the number of data bits per data packet is reduced only when the re-transmission number reaches the predetermined re-transmission number. As a result, the number of data bits per data packet is not reduced if the interference only occurs momentarily. That is, if the interference stops before the predetermined number of re-transmissions has taken place, the number of data bits per data packet is not reduced unnecessarily. Again, this feature of the present method further improves data communication efficiency.

In the first representative data communication method, the first processor 4 communicates to the second processor 6 a number of data bits per data packet as a data packet number. This data packet number is then used after the re-transmission number reaches the predetermined re-transmission number. However, the number of data bits per data packet, which may include a preset data number, can be communicated as the data packet number. In this case, the preset data number is not required to be stored in the second processor 6 and the preset data number can be set as desired.

In the first representative data communication method, once the number of data bits per data packet is reduced, this reduced number is maintained, which makes this method suitable for an environment having continuous interference. However, the data communication efficiency can be improved bed increasing the number of transmitted data bits again after the interference has stopped. For example, if the data transmission interference is caused by the operation of a microwave oven, the number of data bits per data packet Can be increased after the operation of the microwave oven has been terminated, because the transmission environment has likely improved.

For example, if a data number less than the preset data number is being utilized, the number of data bits per data packet can be increased to a number greater than the currently set data number if the determination at step S22 becomes "YES," or the determination at step S22 continues to be "YES" for a predetermined number of times. This additional processing step may be provided, for example, between step S22 and step S24. It this step, the number of data bits per data packet may be increased, for example, to either (1) a data number that is one step greater than the current data number or (2) the preset data number. If the transmission environment deteriorates again after increasing the data number, then the process following step S32 can be executed again as described above to reduce the number of data bits per data packet. Accordingly, the data communication efficiency can be further improved, because the number of data bits per data packet is adjusted to appropriately correspond to the communication environment.

A second representative data communication method that can be utilized with the data communication system shown in FIG. 1 will be described with reference to the flowchart shown in FIG. 4. The data packets used in the second representative example may be the same data packets as used in the first example. However, in the second representative embodiment, while all of the data to be transmitted is transferred from the first processor 4 to the second processor 6 at the same time, the number of data bits per data packet and the predetermined re-transmission number are chosen based upon the particular communication environment.

Figure 4:
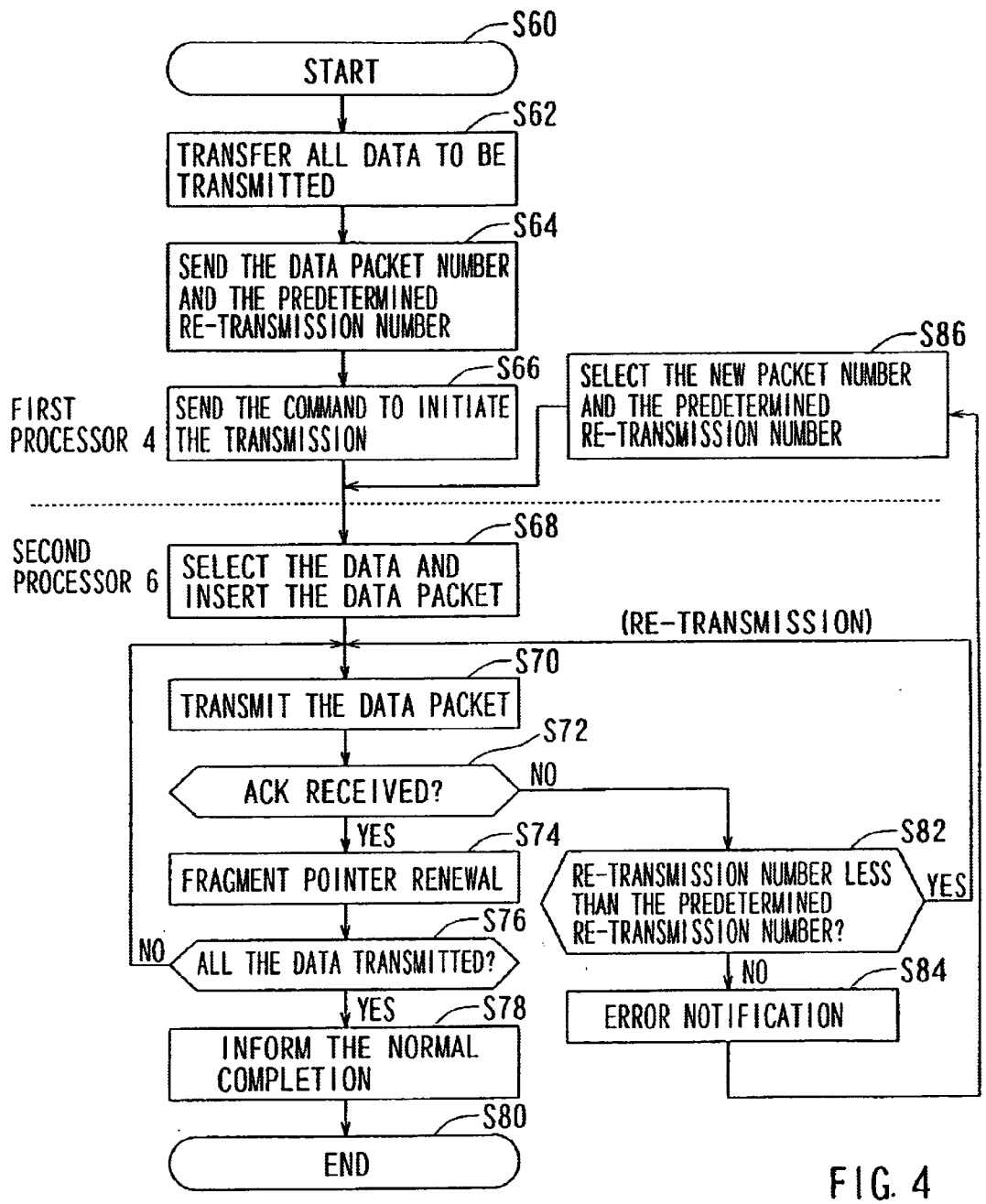
FIG. 4 is a flowchart that shows a second representative data communication method.

Referring to FIG. 4, the process of data transmission is initiated at step S60. At this time, all communication data to be transmitted is transferred from the first processor 4 to the second processor 6 at Step S62 and all the received data is stored in the memory of the second processor 6. The first processor 4 then communicates a data packet number to the second processor 6, which data packet number identifies the number of data bits per data packet, and a predetermined re-transmission number. These values are stored as the initial values of the data packet number and the predetermined re-transmission number in the memory of the second processor 6. As discussed further above, the data packet number may be an integer, for example, "20," "10," etc. or a ratio, for example, "1/50," "1/60," etc.

At step S66, a command to initiate the transmission of the data is sent from the first processor 4 to the second processor 6. After receiving this instruction, the second processor 6 selects the number of data bits as specified by the data packet number from all the data that are stored in the memory. For example, the first 20 data bits may be selected from all the data bits that are to be transmitted, or by dividing all the data bits into 50 portions, the first 1/50 of all the data bits may be selected at step S68. The data bits selected in step S68 are inserted into the communication data portion 26 of the data packet 16, and information that indicates the number of the data bits is inserted into the data size indicator portion 22. The second processor 6 also inserts pointer information into the pointer portion 24 and then transmits this data packet at Step S70.

After transmitting the data packet 16, the second processor 6 determines whether the receiving party for this communication has received the data at step S72. If the determination at step S72 is "YES", then the same pointer information is used again in step S74. In step S76, a determination then is made as to whether all the data that was intended to be transmitted has in fact been transmitted successfully. If the determination at step S76 is "YES," then the second processor 6 sends a signal to notify the first processor that the communication has been completed without error in step S78 and ends the data transmission process at step S80.

On the other hand, if the determination at Step S76 is "NO," then the second processor 6 returns to step S70 to repeat the data transmission process for the remaining data still waiting to be transmitted.

In this case, if the determination at Step S72 is "NO," then the data is transmitted again. At first, a determination is made whether the number of repeated transmissions for these same data is equal to or less than the predetermined re-transmission number at step S82. If the determination at step S82 is "YES," then the process returns to Step S70 to retransmit the data packet 16 with the same data and the same pointer information.

However, if the re-transmission number has reached the predetermined re-transmission number, and the determination at step S82 has become "NO," the second processor 6 sends a signal to notify the first processor 4 that an error has occurred (step S84). When the first processor 4 receives this error signal, it selects a new data packet number and a new predetermined re-transmission number in consideration of the communication environment at step S86 and sends these new values to the second processor 6 at step S66. This new data packet number is chosen to reduce the number of data bits per data packet, but this new predetermined re-transmission number can be reduced, unchanged, or increased from the previous value in correspondence to the communication environment. As noted above, this new data packet number may be an integer or a fraction.

The second processor 6 repeats the process from step S68 with the new data packet number and predetermined re-transmission number, which were communicated by the first processor 4.

As described above, in the second representative data communication method, the number of data bits per data packet is reduced every time that the re-transmission number has reached the predetermined re-transmission number. Therefore, as was true in the first representative method, data can be reliably transmitted using a simple process even in noisy environments. Also, because all the data to be transmitted are transferred from the first processor 4 to the second processor 6 in advance, it is not necessary to transfer data for each data packet. Because transferring all the data at once requires less time than transferring the same data piecemeal, the time required to transmit all the data is minimized to improve the data communication efficiency. Furthermore, because the first processor 4 selects the data packet number and the predetermined re-transmission number, the determination can be reliably performed at high speed.

This second representative data communication method can be also modified such that after reducing the number of data bits per data packet, the number of data bits per data packet can be increased if the communication environment improves, in the same way as the first representative data communication method. For example, when a data number less than the preset data number is set as the number of data bits per data packet, time number of data bits per data packet can be increased to a number greater than the currently set data number if the determination at step S72 becomes "YES," or the determination at step S72 continues to be "YES" for a predetermined number of times. This processing step may be provided, for example, between step S72 and step S74.

With this arrangement, data communication efficiency can be further improved, because the number of data bits per data packet is determined in consideration of the communication environment that exists when the data is being transmitted.

In the second representative data communication method, although the first processor 4 chooses the data packet number and the predetermined re-transmission number, these values may be chosen by the second processor 6. Also, in the second, example, the number of data bits per data packet and the predetermined re-transmission number are changed when the re-transmission number reaches the predetermined re-transmission number. However, the method can be modified to change only the number of data bits per data packet.

In a preferred embodiment of the present data communication techniques, a data packet containing a data signal of 2048 bytes will be re-transmitted 7 times, if a successful transmission is not completed. After seven unsuccessful attempts, the data signal will be reduced to 400 bytes and the abbreviated data packet will be transmitted up to 28 times, if successful transmissions are not completed.

Figure 5:
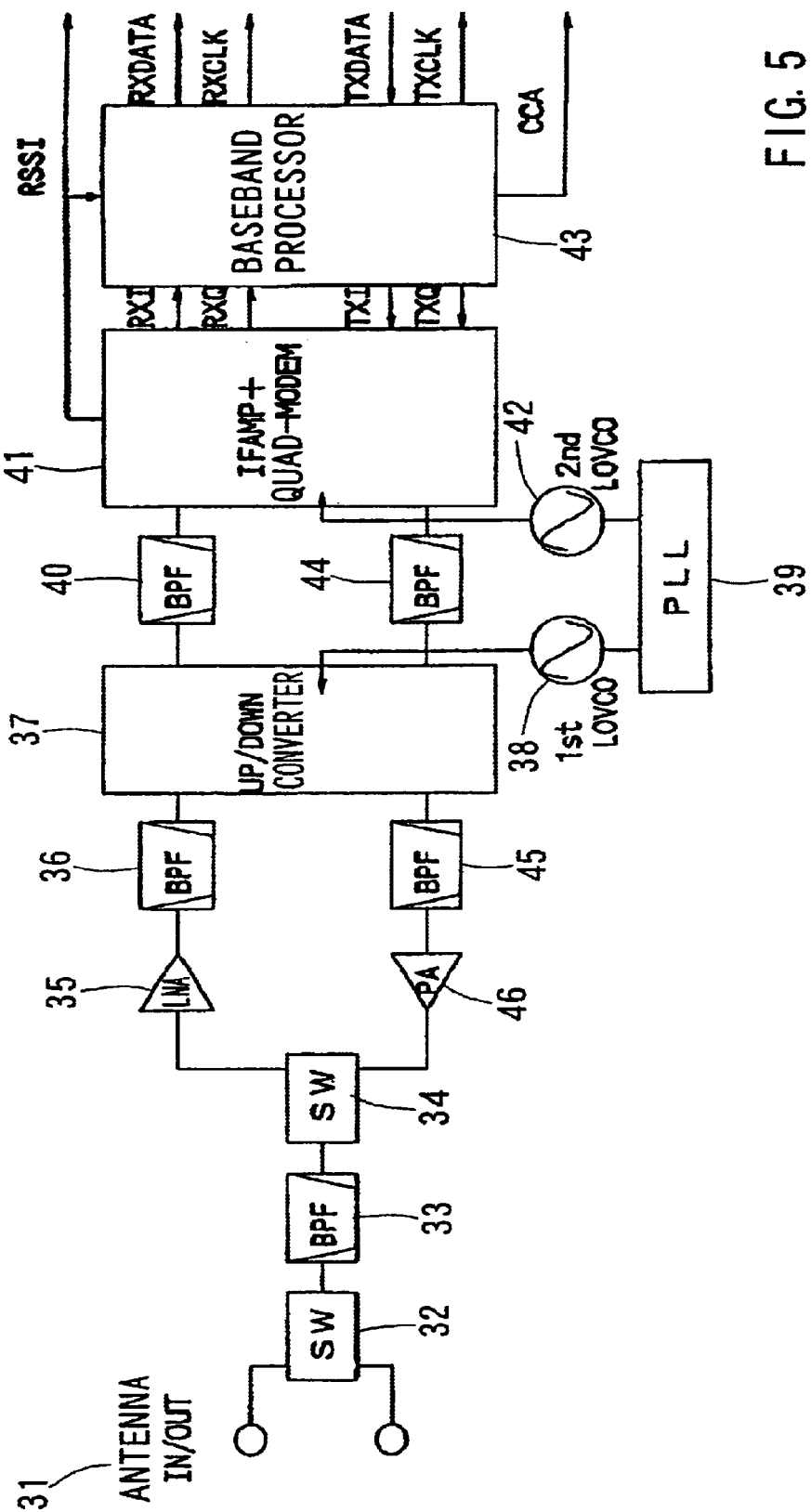
FIG. 5 is a block diagram of a first representative circuit for implementing the data communication methods of FIGS. 3 and 4

Three embodiments will be described to implement the transmitter 8, receiver 10, multiplexor 12 and antenna 14 functions of FIG. 1. For example, a block diagram of a first representative circuit for implementing the present communication methods is shown in FIG. 5. Two antennas 31 are coupled to a switch 32, which can select one of the antennas to perform a space diversity technique. Switch 32 is couples to switch 34 via band pass filter 33. Switch 34 may change the operational mode of the transceiver (i.e., perform a multiplexor function) by selecting between the transmission and receiver circuits. Up/Down Converter 37 can be utilized to down-convert the frequency of a received signal during receiver mode, whereas can be utilized to up-convert the frequency of an IF signal during transmitter mode. Low noise amplifier 35, band pass filter 36, band pass filter 40, 44, 45 and power amplifier 46 may optionally be utilized to improve the efficiency of the transceiver. Naturally, other circuits for up-converting transmission signals before transmission and down-converting received signals may be utilized.

LOVCO 38 is coupled to the Up/Down Converter 37 and provides appropriate signals to down-convert the frequency of received signal and up-convert the frequency of IF signal. LOVCO 42 is coupled to the IF amplifier and quad modem 41 and provides appropriate signals to convert the frequency of down-converted received signal into the frequency of signal (RXI, RXQ) and to convert the frequency of signal (TXI, TXQ) into the frequency of IF signal. A phase lock loop 39 may control the frequency of LOVCOs. A baseband processor 43 may be two-way coupled to the IF amplifier and quad modem 41. This processor 43 can receive signal data (RXI, RXQ) from IF amplifier and quad modem 41 and output the demodulated data (RXDATA) to the second processor 6 according to the clock (RXCLK). Likewise, the processor 43 can receive transmission data (TXDATA) from the second processor 6 according the clock (TXCLK) and output the modulated data (TXI, TXQ) to IF amplifier and quad modem 41. A Clear Channel Assessment (CCA) may optionally be utilized. The representative example of FIG. 5 is preferably utilized for DS-SS communication techniques.

FIG. 6 depicts a second representative example that is particularly useful for FH-SS communication techniques. Generally speaking, an identical circuit as shown in FIG. 5 may be utilized. However, the RF-IF conversion circuit of FIG. 5 may be replaced with an IF amp and a delay detector 52.

Figure 7:
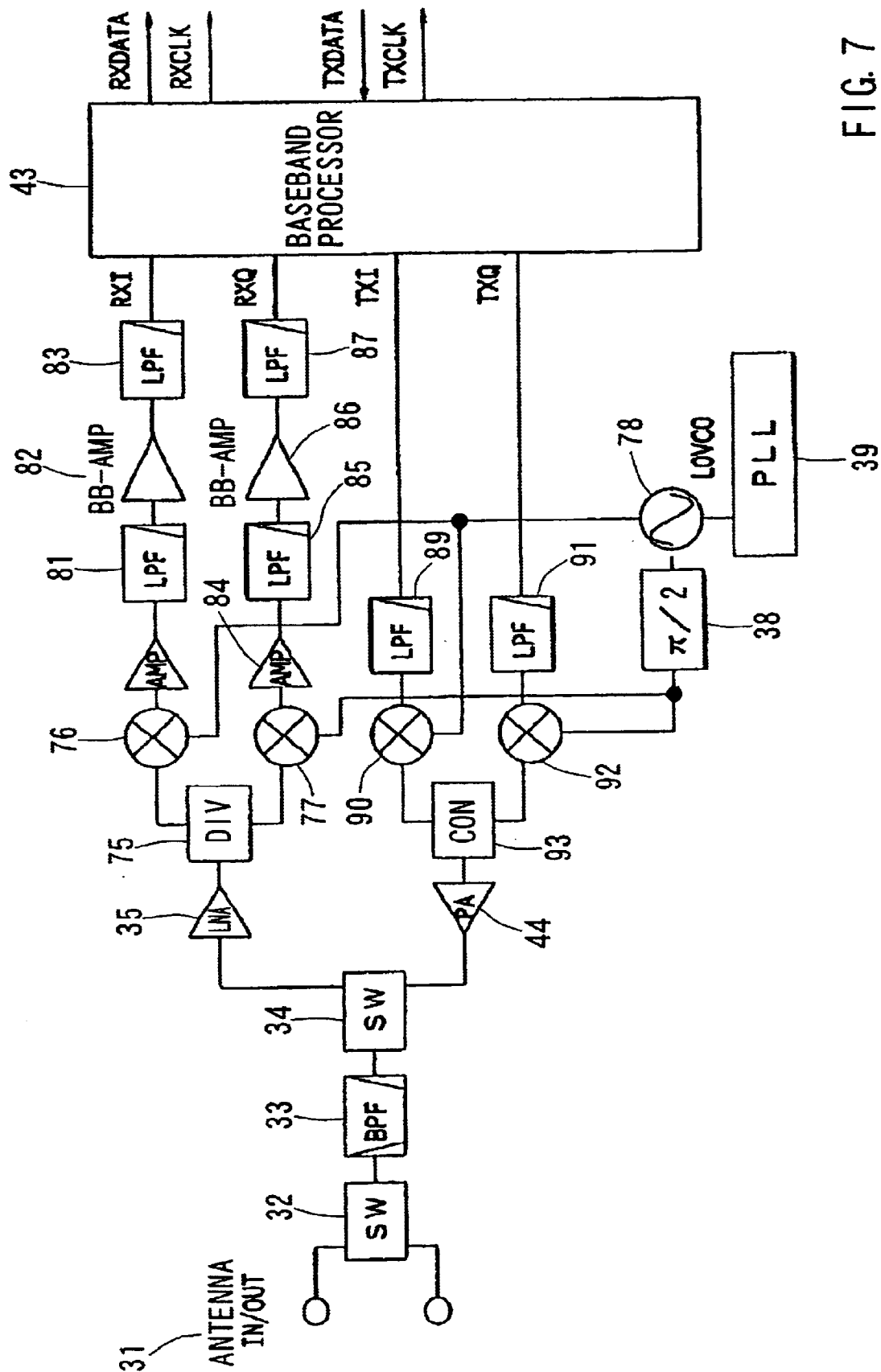
FIG. 7 is a block diagram of a third representative circuit for implementing the data communication methods of FIGS. 3 and 4.

A further representative example is shown in FIG. 7 which is particularly useful for a direct conversion type data communication system. Again, like elements from FIG. 5 have been identified by like reference numerals and a repeated description is therefore not necessary.

The received signal may be amplified by low noise amplifier 35 and separated by a divider 75 and frequency mixers 76, 77. The divided components may be further amplified by amplifier 84 and low pass filtered by low pass filters 81 and 85. These filter component signals may be amplified by baseband amplifiers 82 and 86 and again low pass filtered by low pass filters 83 and 87.

Similarly, transmission signal components from the processor 43 may be low pass filtered by low pass filters 89 and 91, mixed by mixers 90 and 92 and combined by combiner 93 before being amplified and transmitted via the antenna 31. A phase shifter 38 may be utilized to provide a phase shifted signal to the mixers 77 and 92.

Naturally, a variety of circuit architectures may be utilized to implement the present communication techniques in a variety of formats. The present circuits are merely examples. For example, processors 4 and 6 may be any type of general purpose or special purpose microprocessor or other structure that may perform a processing function. Processors 4 and 6 may include programming and circuit means to perform functions, such as generating and transmitting data packets, processing acknowledgement signals from a receiving party, counting re-transmissions, creating abbreviated data packet if the number of re-transmissions reaches a predetermined number, insert pointer information, etc. However, each of these functions also can be performed by separate processors or by other dedicated circuits.

What is claimed:

1. A method for communicating data comprising the steps of:

transferring data to be transmitted and a re-transmission number from a first processor to a second processor;

transmitting from the second processor a first data packet having a first number of data bits, re-transmitting from the second processor the first data packet, if a signal acknowledging receipt of the first data packet is not received from a receiving party, repeating the re-transmission step a number of times identified by the re-transmission number if the receiving party continues not to receive the first data packet, informing the first processor if the receiving party has not received the first data packet after it has been re-transmitted the number of times identified by the re-transmission number, reducing the number of data bits in the first data packet by to a number of data bits identified by the first processor to create a second data packet having a second number of data bits, transmitting the second data packet.

2. A method for communicating data as set forth in claim 1 further comprising:

inserting pointer information to mark a sequence into the first data packet and the second data packet before transmitting the first data packet and the second data packet.

3. A method for communicating data as set forth in claim 1, further comprising:

reducing the number of data bits in the second data packet to create a third data packet having a third number of data bits, if the receiving party has not received the second data packet after a number of times identified by the re-transmission number and transmitting the third data packet.

4. A method for communicating data as set forth in claim 1 further comprising the steps of:

storing all transmission data in a memory connected to the second processor, storing a data packet number and the re-transmission number in the memory, creating a first number of data bits from all the transmission data based on the data packet number.

5. A method for communicating data comprising the steps of:

selecting in a second processor a first number of data bits from a data stream from a first processor, which first number of data bits are to be transmitted but have not yet been transmitted, transmitting from a second processor a first data packet having the selected first number of data bits, re-transmitting from a second processor the first data packet, if a signal acknowledging receipt of the first data packet is not received from a receiving party, repeating the re-transmission step a predetermined number of times if the receiving party continues not to receive the first data packet, informing the first processor when the receiving party fails to receive the first data packet after a predetermined re-transmission number is reached, selecting a second number of data bits that has been divided by a number of data packets, received from the first processor, from the data stream that has not yet been transmitted, and transmitting a second data packet that includes the selected second number of data, if a predetermined re-transmission number has been reached.

6. A method for communicating data as set forth in claim 5, further comprising:

inserting pointer information to mark a sequence into the first data packet and the second data packet before transmitting the first data packet and the second data packet.

7. A method for communicating data as set forth in claim 5, further comprising:

selecting a third number of data bits from the data bits to be transmitted and transmitting a third data packet having the third number of data bits, if the receiving party has not received the second data packet after a predetermined number of re-transmissions.

8. A method for communicating data as set forth in claim 5, further comprising:

changing the predetermined number of re-transmissions, if the receiving party does not receive the selected first number of data and transmitting a second number of data bits, if the number of re-transmissions reaches the predetermined number of re-transmissions.

9. A method for communicating data as set forth in claim 5 further comprising the steps of:

storing all transmission data in a memory connected to the second processor, storing a data packet number and a re-transmission number in the memory, selecting a first number of data bits from re-transmitted data of all the transmission data based on the data packet number.

10. A data communication system for transmitting data, comprising:

a first processor and a second processor in communication with the first processor, the second processor receiving data transferred from the first processor, the second processor having:

a data packet generator that outputs a first data packet having the received data, a transmitter coupled to the data packet generator for transmitting the first data packets to a receiving party, an acknowledgement circuit that monitors acknowledgement signals from the receiving party and generates an output if an acknowledgment signal is received, a counter coupled to the acknowledgement circuit and the transmitter for counting the number of transmissions of data packets without receiving an acknowledgement signal from the receiving party, the counter generating a noisy environment signal if a pre-determined number of transmissions have occurred without receiving an acknowledgment signal and a reduced data packet generator coupled to the transmitter and the counter for generating a second data packet having a reduced number of data bits, if the counter generates the noisy environment signal.

11. A data communication system as set forth in claim 10, wherein the second processor further comprises means for inserting pointer information to mark a sequence into the data packets before the data packets are communicated to the transmitter.

12. A data communication system as set forth in claim 10, wherein:

while said second processor transmits data packets each of which includes said divided first number of transmitted data if data are received by the receiving party successfully and continuously for a preset number of tunes, then said second processor transmits a data packet that includes a second number of data, said second number being greater than said first number.

13. A data communication system comprising:

a first processor, a second processor coupled to the first processor, wherein the first processor communicates transmission data and a data packet number to the second processor, the second processor selects a number of data bits from un-transmitted data based on the data packet number and transmits a data packet that includes the selected data bits, wherein if the transmitted data bits are not received by a receiving party, the second processor retransmits a data packet with the same data bits, wherein:

if the first processor receives from the second processor a signal indicating that the number of re-transmissions has reached a predetermined re-transmission number, then the first processor provides a new data packet number that is different from the previous data packet number; and the second processor sends to the first processor said signal indicating that the number of re-transmissions has reached the predetermined re-transmission number, and then the second processor selects a number of data bits based on the new data packet number from the un-transmitted data, the new data packet number being provided from the first processor, wherein an antenna is coupled to the second processor to transmit the data packet signals and to receive communication signals.

14. A data communication system as set forth in claim 13, wherein the first processor communicates the predetermined re-transmission number to the second processor and wherein the first processor outputs a new predetermined re-transmission number that is different from the previous predetermined re-transmission number when the first processor receives from the second processor the signal indicating that the number of re-transmissions has reached the predetermined re-transmission number.

* * * * *

UNITED STATES PATENT AND TRADEMARK OFFICE
CERTIFICATE OF CORRECTION

PATENT NO. : 6,6724,777 B1
DATED : April 20, 2004
INVENTOR(S) : Kasuji Yamazaki et al.

It is certified that error appears in the above-identified patent and that said Letters Patent is hereby corrected as shown below:

Title page,
Item [56], References Cited, FOREIGN PATENT DOCUMENTS,
Please delete "JP 63-62525", and insert therefore -- JP 63-61525 --.

Column 5,
Line 20, please delete "25" and insert therefore -- 26 --
Line 22, please delete "26)" and insert therefore -- 26 --.

Column 11,
Line 32, please delete "by"

Signed and Sealed this

Tenth Day of August, 2004

JON W. DUDAS
*Acting Director of the United States Patent and Trademark Office*